(12) United States Patent
Corliss et al.

(10) Patent No.: US 7,680,100 B1
(45) Date of Patent: Mar. 16, 2010

(54) INTERNET PROTOCOL APPLIANCE MANAGER

(75) Inventors: James R. Corliss, Thornton, CO (US); Steven W. Erickson, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 1414 days.

(21) Appl. No.: 11/036,305

(22) Filed: Jan. 13, 2005

Related U.S. Application Data (60) Provisional application No. 60/615,451, filed on Sep. 30, 2004.

(51) Int. Cl.
*H04L 12/66* (2006.01)

(52) U.S. Cl. .................................. 370/354; 379/88.17

(58) Field of Classification Search ......... 370/352–356, 370/350, 468; 455/423; 709/245
See application file for complete search history.

(56) References Cited

U.S. PATENT DOCUMENTS

| | | | |
|---|---|---|---|
| 5,802,058 A | 9/1998 | Harris et al. | |
| 5,946,311 A | 8/1999 | Alexander, Jr. et al. | |
| 6,118,785 A | 9/2000 | Araujo et al. | |
| 6,223,287 B1 * | 4/2001 | Douglas et al. ............. | 713/178 |
| 6,252,857 B1 | 6/2001 | Fendick et al. | |
| 6,353,616 B1 | 3/2002 | Elwalid et al. | |
| 6,389,038 B1 | 5/2002 | Goldberg et al. | |
| 6,434,139 B1 | 8/2002 | Liu et al. | |
| 6,438,137 B1 | 8/2002 | Turner et al. | |
| 6,449,344 B1 | 9/2002 | Goldfinger et al. | |
| 6,453,349 B1 | 9/2002 | Kano et al. | |
| 6,477,164 B1 | 11/2002 | Vargo et al. | |
| 6,483,835 B1 | 11/2002 | Tanigawa et al. | |
| 6,515,966 B1 | 2/2003 | Bardalai et al. | |
| 6,519,254 B1 | 2/2003 | Chuah et al. | |
| 6,563,793 B1 | 5/2003 | Golden et al. | |
| 6,598,080 B1 | 7/2003 | Nagami et al. | |
| 6,674,744 B1 | 1/2004 | Doshi et al. | |
| 6,678,474 B1 | 1/2004 | Masuda et al. | |
| 6,683,874 B1 | 1/2004 | Nagami et al. | |

(Continued)

FOREIGN PATENT DOCUMENTS

JP      62-219732      9/1987

(Continued)

OTHER PUBLICATIONS

U.S. Appl. No. 09/359,850, filed Feb. 7, 2003, Scholte.

(Continued)

*Primary Examiner*—Simon Sing
(74) *Attorney, Agent, or Firm*—Sheridan Ross P.C.

(57) ABSTRACT

A system and method for allowing remote access to an IP communications network is disclosed. In one embodiment, a method for allowing access to an IP network comprises: sending a first message addressed to a first port of an IP communications network component, the first message comprising a command requesting the performance of a selected telecommunications function; a selected IP endpoint performing, in response to the first message, the selected telecommunications function; sending a second message addressed to a different second port of the IP communications network component, the second message comprising a request for information associated with the IP endpoint; and tunneling, in response to receiving the second message at the second port, the second message to the IP endpoint.

32 Claims, 5 Drawing Sheets

U.S. PATENT DOCUMENTS

| | | | |
|---|---|---|---|
| 6,697,352 | B1 | 2/2004 | Ludwig et al. |
| 6,735,190 | B1 | 5/2004 | Chuah et al. |
| 6,738,909 | B1 * | 5/2004 | Cheng et al. ............... 726/3 |
| 6,763,392 | B1 | 7/2004 | del Val et al. |
| 6,931,025 | B1 | 8/2005 | Masuda |
| 6,931,448 | B2 | 8/2005 | Holler et al. |
| 6,959,393 | B2 * | 10/2005 | Hollis et al. ............... 726/21 |
| 6,967,927 | B1 | 11/2005 | Dugeon et al. |
| 6,970,450 | B1 | 11/2005 | Scott |
| 7,107,354 | B2 | 9/2006 | Scholte |
| 7,126,939 | B2 | 10/2006 | Barany et al. |
| 7,136,351 | B2 | 11/2006 | Metin et al. |
| 7,139,263 | B2 | 11/2006 | Miller et al. |
| 7,143,191 | B2 | 11/2006 | Chuah et al. |
| 7,286,536 | B2 | 10/2007 | Greis et al. |
| 7,301,948 | B2 | 11/2007 | Omae et al. |
| 7,400,582 | B2 | 7/2008 | Shaheen et al. |
| 7,420,988 | B1 | 9/2008 | Grossman |
| 7,492,720 | B2 | 2/2009 | Pruthi et al. |
| 2001/0025321 | A1 | 9/2001 | Tang et al. |
| 2002/0087699 | A1 | 7/2002 | Karagiannis et al. |
| 2002/0097798 | A1 | 7/2002 | Manor |
| 2003/0133459 | A1 | 7/2003 | Siddiqui et al. |
| 2003/0229690 | A1 | 12/2003 | Kitani et al. |
| 2004/0105459 | A1 | 6/2004 | Mannam |
| 2004/0139088 | A1 | 7/2004 | Mandato et al. |
| 2004/0151206 | A1 | 8/2004 | Scholte |
| 2004/0196843 | A1 | 10/2004 | Zinin |
| 2005/0013287 | A1 | 1/2005 | Wallentin et al. |
| 2005/0053009 | A1 * | 3/2005 | Denby et al. ............... 370/250 |
| 2005/0117580 | A1 | 6/2005 | del Val et al. |
| 2005/0195797 | A1 * | 9/2005 | Kryuchkov et al. ......... 370/352 |
| 2005/0207340 | A1 | 9/2005 | O'Neill |
| 2005/0216776 | A1 | 9/2005 | Watanabe |
| 2005/0226235 | A1 | 10/2005 | Kumar et al. |
| 2006/0114889 | A1 | 6/2006 | Schneider et al. |
| 2006/0168337 | A1 | 7/2006 | Stahl et al. |
| 2006/0182117 | A1 | 8/2006 | Chen et al. |
| 2006/0233333 | A1 | 10/2006 | Brombal et al. |
| 2006/0256719 | A1 | 11/2006 | Hsu et al. |
| 2007/0115825 | A1 | 5/2007 | Roberts |
| 2007/0242677 | A1 | 10/2007 | Shaheen et al. |
| 2008/0019386 | A1 | 1/2008 | Chen et al. |

FOREIGN PATENT DOCUMENTS

| | | |
|---|---|---|
| JP | 2000-138711 | 5/2000 |
| JP | 2000-174818 | 6/2000 |
| JP | 2002-141932 | 5/2002 |
| JP | 2002-190825 | 7/2002 |
| JP | 2002-354020 | 12/2002 |
| WO | WO 00/11849 | 3/2000 |
| WO | WO 02/13023 | 2/2002 |

OTHER PUBLICATIONS

U.S. Appl. No. 10/675,719, filed Sep. 19, 2003, Roush et al.
U.S. Appl. No. 10/808,172, filed Mar. 23, 2004, Scholte.
Article entitled, "Jabber::Protocol—Delayed Delivery," available at Jabber Software Foundation (1999-2003), http://www.jabber.org/protocol/delay.html, 3 pages.
Article entitled, "Jabber:: Protocol—How File Transfer Works," Jabber Software Foundation (1999-2003), available at http://www.jabber.org/protocol/filetransfer.html, 3 pages.
Article entitled, "Jabber::Protocol—Presence Subscriptions," Jabber Software Foundation (1999-2003), available at http://www.jabber.org/protocol/subscriptions.html, 15 pages.
Article entitled, "Jabber:: Protocol—Authentication," Jabber Software Foundation (1999-2003), available at http://www.jabber.org/protocol/authentication.html, 1 page.
Article entitled, "Jabber:: Protocol—Core Data Elements," Jabber Software Foundation (1999-2003), available at http://www.jabber.org/protocol/coredata.html, 7 pages.
Article entitled, "Jabber:: Protocol—XML Streams," Jabber Software Foundation (1999-2003), available at http://www.jabber.org/protocol/xmlstreams.html, 6 pages.
Article entitled, "Jabber::Protocol—Groupchat," Jabber Software Foundation (1999-2003), available at http://www.jabber.org/protocol/groupchat.html, 4 pages.
Article entitled, "Instant Messaging Guide—ICQ (I Seek You)," ViewZ Instant Messaging Guide (May 23, 2003), available at http://www.viewz.com/features/imguide2.shtml, 3 pages.
Braden, R., et al., "Resource ReSerVation Protocol (RSVP)," Network Working Group, RFC 2205 (Sep. 1997) pp. 1-112.
Bernet, Y, "Format of the RSVP DCLASS Object," Network Working Group, RFC 2996 (Nov. 2000) pp. 1-7.
Cherry, Steven, "IM Means Business," *IEEE Spectrum* (Nov. 2002), pp. 28-32.
Hildebrand, Joe, et al., "Allow access to a Jabber server from behind firewalls which do not allow outgoing sockets on port 5222, via HTTP requests," Jabber Enhancement Proposal No. 0025, available at http://www.jabber.org/jeps/jep-0025.html, downloaded May 22, 2003, 7 pages.
Huuhtanen, Juha, "Real-Time Streaming Protocol (RTSP)," Dept. of Computer Science and Engineering, Helsinki University of Technology (Nov. 22, 1998), available at http://www.tcm.hut.fi/Studies/Tik-110.300/1998/Essays/rtsp.html, 7 pages.
"The Instant Messaging Standards Race: Comparing XMPP/Jabber and SIP/SIMPLE," Jabber, Inc., Version 1.0 (May 2003), pp. 1-11.
Millard, Peter, "A protocol which allows two jabber endpoints to negotiate feature options between themselves," Jabber Enhancement Proposal No. 0020, Jabber Software Foundation, available at http://www.jabber.org/jeps/jep-0020.html, downloaded May 22, 2003 (15 pages).
Millard, Peter, "A protocol for managing server-side blacklist and whitelist rules," Jabber Enhancement Proposal No. 0016, Jabber Software Foundation, available at http://www.jabber.org/jeps/jep-0016.html, downloaded May 22, 2003 (7 pages).
Miller, Jeremie, et al., "Jabber protocol elements can be given an expiry date/time, a "use-by" timestamp, by attaching to it an <x/> extension qualified by the jabber:x:expire namespace," Jabber Enhancement Proposal No. 0023, Jabber Software Foundation, available at http://www.jabber.org/jeps/jep-0023.html, downloaded May 22, 2003 (4 pages).
Miller, Matthew, "A protocol for reporting and executing ad-hoc, human-oriented commands in Jabber," Jabber Enhancement Proposal No. 0050, Jabber Software Foundation, available at http://www.jabber.org/jeps/jep-0050.html, downloaded May 22, 2003 (16 pages).
Ridgway, Neil, "The Real-time Transport Protocol (RTP)," (Sep. 7, 1998), available at http://www.mmrg.ecs.soton.ac.uk/publications/archive/ridgway1998/html/node23.html, 2 pages.
Ridgway, Neil, "The Real Time Streaming Protocol (RTSP)," (Sep. 7, 1998), available at http://www.mmrg.ecs.soton.ac.uk/publications/archive/ridgway1998/html/node29.html, 2 pages.
"Risk Exposure Through Instant Messaging and Peer-To-Peer (P2P) Networks," An X-Force™ White Paper, Internet Security Systems, Inc. (Apr. 2002), pp. 1-27.
Saint-Andre, Peter, "A robust protocol for text-based conferencing in Jabber," Jabber Enhancement Proposal No. 0045, Jabber Software Foundation, available at http://www.jabber.org/jeps/jep-0045.html, downloaded May 22, 2003 (82 pages).
Sjoberg, J., et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group RFC 3267 (Jun. 2002), available at http://rfc.sunsite.dk/rfc/3267.html, pp. 1-49.
Schulzrinne, H., et al., "RTP: A Transport Protocol for Real-Time Applications," Network Working Group RFC 1889 (Jan. 1996), available at http://www.iptel.org/info/players/ietf/media/rfc1889.txt, pp. 1-75.

Smith, Spencer, "Be Aware of Security Issues with ICQ Instant Messaging," *Computing News* (Spring 2000), available at http://cc.uoregon.edu/cnews/spring2000/icq.html, 5 pages.

"Special Report: Taking the voice over IP plunge," *NetworkWorld* (2003), pp. 1-12.

Tanigawa, Keiko et al., "Simple RTP Multiplexing Transfer Methods for VOIP," Internet draft document of The Internet Engineering Task Force, Nov. 18, 1998, available at http://www.ietf.org/proceedings/02mar/I-D/draft-ieft-avt-tcrtp-06.txt, The Internet Society.

Thompson, Bruce et al., "Tunneling Multiplexed Compressed RTP ("TCRTP")," Internet draft document of The Internet Engineering Task Force, Feb. 27, 2002, The Internet Society.

Thompson, Bruce et al., Tunneling Multiplexed Compressed RTP ("TCRTP"), Internet draft document of The Internet Engineering Task Force, Jul. 19, 2001, available at http://www.ietf.org/proceedings/01aug/I-D/draft-ietf-avt-tcrtp-04.txt, The Internet Society.

Tyson, Jeff, "How Instant Messaging Works," HowStuffWorks, Inc., available at wysiwyg://65/http://www.howstuffworks.com/instant-messaging.htm, downloaded May 22, 2003, 3 pages.

Vamosi, Robert, "The next hacker target: instant messaging," ZDNET Reviews (May 30, 2002), available at http://zdnet.com.com/2100-1107-928415.html, 3 pages.

Background of the Invention for the above-captioned application (previously provided).

* cited by examiner

INTERNET PROTOCOL APPLIANCE MANAGER

CROSS REFERENCE TO RELATED APPLICATIONS

The present application claims the benefits under 35 U.S.C. §119(e) of U.S. Provisional Application Ser. No. 60/615,451, of the same title, filed Sep. 30, 2004, to Corliss and Erickson, which is incorporated herein by reference in its entirety.

FIELD OF THE INVENTION

The present invention relates to a suite of tools that allow remote diagnostic troubleshooting of Internet Protocol (IP) endpoints.

BACKGROUND OF THE INVENTION

Private IP communications systems, such as private IP telephony systems, typically comprise a communications server connected to an external communications network, such as a public switched telephone network (PSTN), and a private data network (i.e. a converged IP network). IP endpoints, such as IP telephones (e.g., Avaya Call Manger Definity™ products), are connected to the private data network and provide for IP communications under the control of the communications server. In addition to the IP endpoints used in connection with communications, a customer's private data network typically includes data processing and storage components, such as server computers, client computers and network storage devices. Thus, giving a third party access to the customer's private data network so the third party has access to the IP endpoints, such as for support and troubleshooting of the IP communications system, increases security risks associated with the private data network. Since the third party does not typically need access to the private data network except for limited actions related to communicating with the IP endpoints, the increased security risks are typically not warranted. Furthermore, access to customer devices on the private data network other than the IP endpoints and other components provided as part of the private IP communications system is not necessary for the third party to support and troubleshoot the customer's IP communications system. Thus, the risk of accidental or intentional actions that may damage the private data network should be minimized by limiting the third party's access to only the portions of the network that the third party actually needs to access.

While the third party would typically have access to a communications server attached to an external communications network, the communications server is also typically isolated from the customer's private data network. For example, since the communications server controls sensitive communications such as 911 emergency calls, the communications server is usually isolated from the private data network to prohibit access to the communications server from users of the private data network.

Thus, when the customer's communications system requires support or troubleshooting of the IP endpoints located on the customer's private data network, the third party must send a technician to the location of the private data network. The technician is assigned an IP address and connects to the private data network to access the IP endpoints. The technician, for example, may utilize a maintenance information bulletin (MIB) browser to read configuration or operating information from the IP endpoints. After the technician has collected the required information, the technician typically disconnects from the private data network, establishes a remote connection with the third party's network and forwards the retrieved information back to the third party for analysis.

SUMMARY OF THE INVENTION

The present invention provides a system and method for securely and remotely accessing information stored on IP endpoints and other components provided as part of a private IP communications system interconnected with an enterprise converged IP network. The system and method allow limited access for a remote user to IP communications devices, such as IP endpoints, signal channel media processors and bearer channel media processors, located on a converged IP network. The system and method further prevent the user from being able to access general purpose computing devices on the converged IP network. In this manner, a remote user can access devices related to an IP communications system without having access to general purpose computing devices residing on the same converged IP network.

In one embodiment, for example, a method for allowing remote access to an IP communications network comprises: sending a first message addressed to a first port of an IP communications network component (e.g., a signal or bearer channel media processor), the first message comprising a command requesting the performance of a selected telecommunications function (e.g., dial tone, off-hook, on-hook, etc.); a selected IP endpoint performing, in response to the first message, the selected telecommunications function; sending a second message addressed to a different second port of the IP communications network component, the second message comprising a request for information associated with the IP endpoint; and tunneling, in response to receiving the second message at the second port, the second message to the IP endpoint.

In another embodiment, a system for allowing remote access to an IP endpoint device on a communications network comprises a communications server adapted to manage communications functions of a selected IP endpoint via a communications device and a first communications network. The communications server comprises: (a) a remote communications application residing on the communications server adapted to communicate with a remote diagnostic system via a second communications network, the remote communications application adapted to receive a query for the IP endpoint from the remote diagnostic system and to provide a response to the query received from the IP endpoint to the remote diagnostic system; and (b) an appliance manager application residing on the communications server adapted to send a first message addressed to a first port of the communications device, the first message comprising a command requesting the performance of a selected telecommunications functions at the IP endpoint, tunnel the query to the IP endpoint via a different second port of the communications device and receive a response from the IP endpoint via the communications device. The communications server is adapted to be isolated from the first communications network via the communications device, and the application manager application is adapted to allow limited communication between the communications server and the IP endpoint via the communications device.

DETAILED DESCRIPTION

Figure 1:
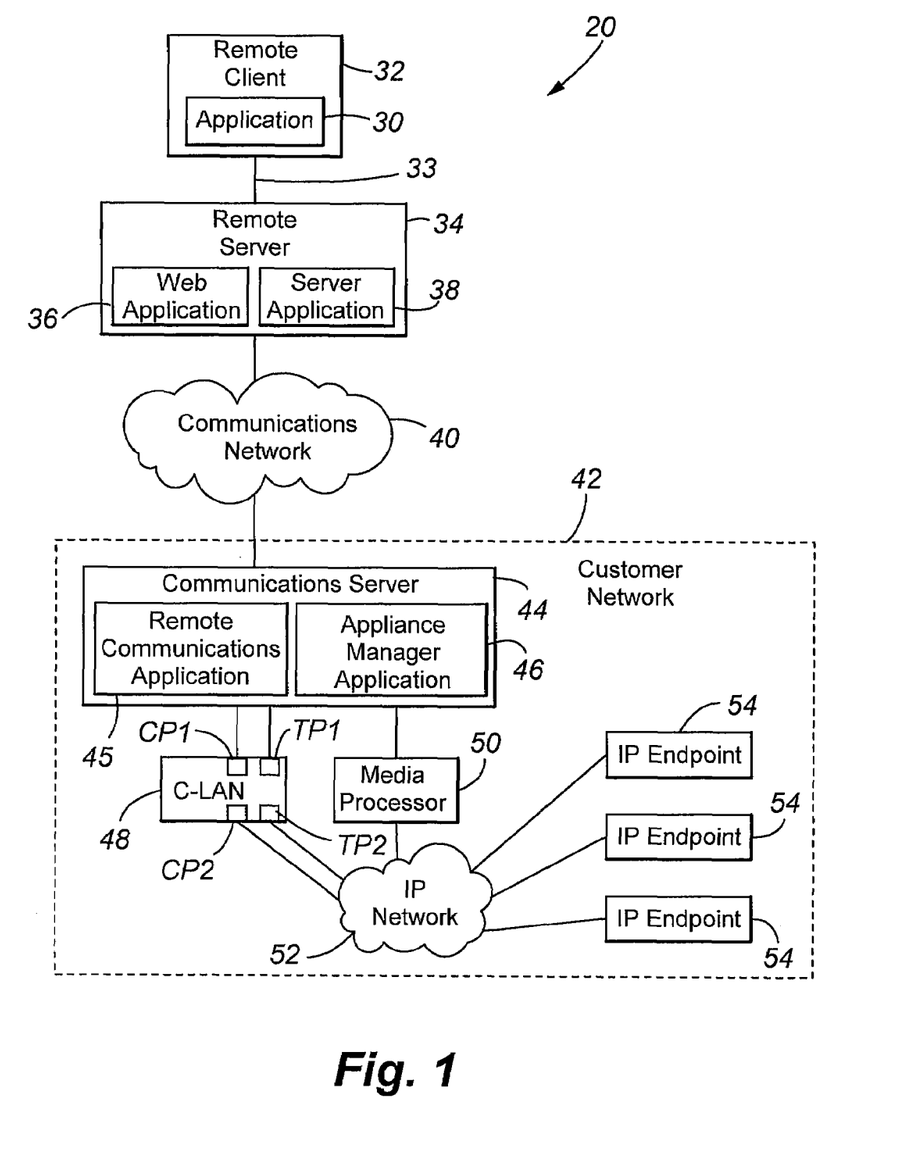
FIG. 1 shows a block diagram of an exemplary embodiment of a system for remotely accessing an Internet Protocol (IP) communications device.

FIG. 1 shows a block diagram of an exemplary embodiment of a system 20 for remotely accessing an Internet Protocol (IP) device. As shown in FIG. 1, the system 20 comprises a remote diagnostic system 24 interconnected to a customer network 42 by a communications network 40. The remote diagnostic system 24 may include a remote client 32 in communication with a remote server 34. The customer network 42 generally comprises a converged private data network. With respect to providing real time IP communications functions, such as telephony functions, the customer network comprises a number of IP endpoints 54. In addition, the customer network 42 may comprise a number of general purpose computing devices 26, such as data processing and/or storage components. The IP communications endpoints 54 and the general purpose computing devices 26 are part of a converged IP network 52 included in the customer network 42. In addition, the customer network 42 comprises a communications server 44 interconnected to the IP network through a signal channel media processor 48 (e.g., a C-LAN device) and/or a bearer channel media processor 50.

In accordance with embodiments of the present invention, the communications server 44 interconnects the IP endpoints 54 to other communications endpoints 28 through a communications network 40, such as a WAN and/or the PSTN. Accordingly, embodiments of the present invention are associated with providing telephony and other communications functions to users of the IP endpoints 54 interconnected to a converged IP network 52. Furthermore, commands and data associated with such communications functions may be passed between the communications server 44 and the IP endpoints 54 through a signal channel media processor 48 and/or a bearer channel media processor 50. In general, the signal channel media processor 48 controls or is associated with the IP endpoints 54 and communications features, such as "dial tone," "on-hook," "off-hook," "hold," "call conferencing" and the like. The bearer channel media processor 50 is generally associated with the management and control of data, such as voice data streams.

The remote client 32 may include a client application 30 residing on the remote client 32. The remote client 32, for example, comprises a computer such as a personal computer, a server, a mainframe computer, a mini computer, a personal data assistant (PDA), a web-enabled telephone and the like.

The client application 30 communicates with a remote server 34. The remote server 34, for example, comprises a Unix™ server, a Linux server, a Windows™ server or the like. A web application 36 and a server application 38 reside on the remote server 34. The web application 36, in one embodiment, comprises a web server application that communicates with the client application 30 (e.g., a web browser application) residing on the remote client 32. In this embodiment, the client application 30 of the remote client 32 communicates with the web application 36 of the remote server 34 using a protocol such as HyperText Transfer Protocol (HTTP). The client application 30 may communicate with the web application 36 via any means known in the art, however. The client application 30, for example, may communicate with the web application 36 over a network such as a public switched telephone network (PSTN), a local area network (LAN), a wide area network (WAN), the Internet, an intranet, a private network, a public network or the like, or any combination of networks.

The web application 36 residing on the remote server 34 functions as an intermediary between the client application 30 and the server application 34. When the web application 36 receives a request from the client application 30, the web application 36 initiates the server application 38 and forwards the request to the server application 38.

The remote server 34 also communicates with a communications server 44 located on a customer's network 42 via a communications network 40. The communications network 40, for example, may comprise a PSTN, the Internet, a WAN, a LAN, an intranet, a private network, a private network or the like, or any combination of communications networks. The server application 38 residing on the remote server 34 manages communication between the remote server 34 and the communications server 44 from the remote server 34 end.

The communications server 44 manages at least a portion of the IP communications for an enterprise, such as a customer of a communications support and troubleshooting third party. The communications server 44, in one embodiment, comprises a telecommunications server such as an Avaya, Inc. S8500™ Media Server, although other communications servers may be used. The communications server 44, for example, may manage circuit-switched and voice over IP (VoIP) telecommunications for the enterprise (customer) network. In managing VoIP communications, the communications server 44 manages the communications of IP endpoints 54 interconnected to the server through the converged IP network 52 of the customer network 42. In the embodiment shown in FIG. 1, for example, the communications server 44 controls the communications links between an IP endpoint 54 and another communications endpoint 28 (e.g., a telephone) interconnected to the communications server 44 through the communications network 40 (e.g., a PSTN), via a signal channel media processor 48. The communications server 44 further controls voice and/or data traffic via a bearer channel media processor 50.

Figure 2:
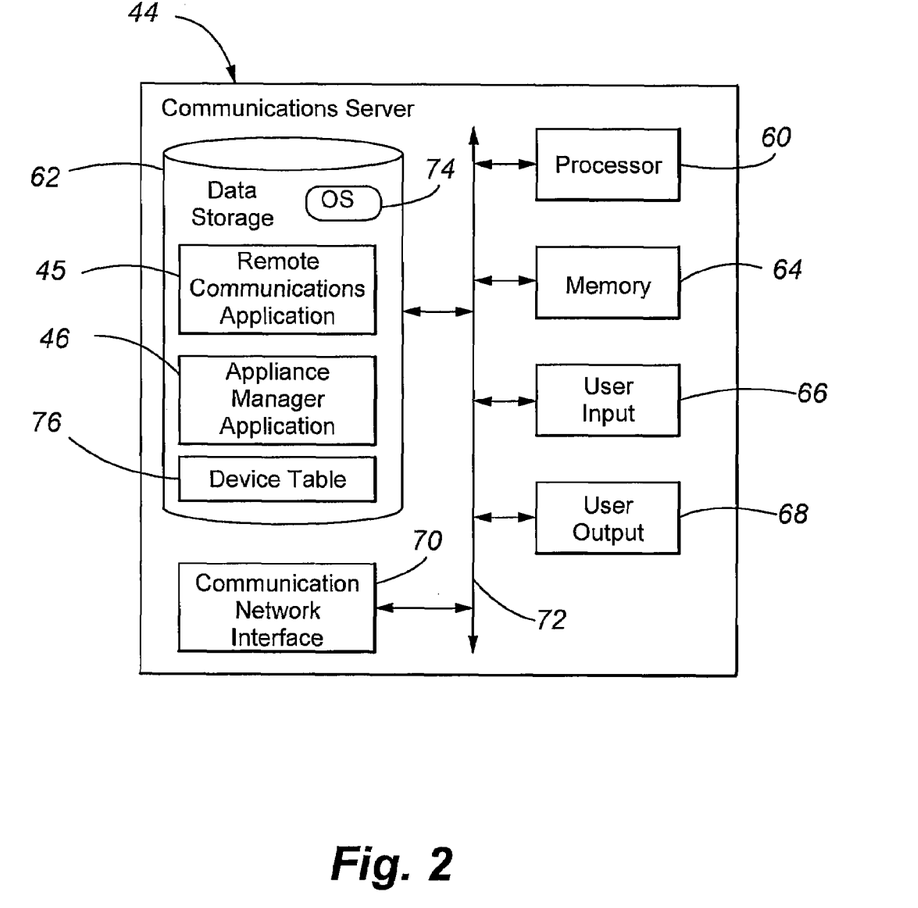
FIG. 2 shows a block diagram of one embodiment of a communications server for use in the system of FIG. 1.

FIG. 2 shows one embodiment of the communications server 44 of FIG. 1. In this embodiment, the communications server 44 comprises a processor 60, a data storage device 62, a memory 64, a user input 66, a user output 68 and a communication network interface 70 connected via a bus 72. The processor 60 of the communications server 44 executes applications stored in the data storage device 62 via the memory 64. The processor 60, for example, executes an operating system 74 stored in the data storage device 62. The operating system 74 may comprise an operating system for managing the operation of a communications server such as Linux, Unix™ or Windows™ or the like. The processor 60 also executes a remote communications application 45 for managing communications with the remote server 34 shown in FIG. 1 and an appliance manager application 46 for managing communications with the signal channel media processor 48, the bearer channel media processor 50 and the IP endpoints 54 also shown in FIG. 1. In addition, in the embodiment shown in FIG. 2, the processor 60 also accesses a data table 76 during the execution of the appliance manager application 46. The data table 76, as described below, comprises device identifiers for one or more device(s), such as the IP endpoint(s) 54 connected to the converged IP network 52, to enable the communications server 44, via the communications network interface 70, to communicate with the IP endpoint(s) 54 via and the signal channel media processor 48 and/or the bearer channel media processor 50.

In addition, the user input 66 and the user output 68 of the communications server 44 allow for user input into and output from the communications server 44. The communication network interface 70 further allows the communications server 44 to communicate with a network, such as the communication network 40 and/or the converged IP network 52.

The communications server 44 is connected to a converged IP network 52 of the customer network 42 via a signal channel media processor 48 and a bearer channel media processor 50 (e.g., an Avaya Prowler™ media processor). The signal channel media processor 48 and the bearer channel media processor 50, for example, may reside within the communications server and/or may be located remotely from the communications server 44 and provide connections between the communications server 44 and the converged IP network 52 of the customer network 42. The communications server 44 may manage circuit-switched telecommunications functions as well as IP telecommunications functions (e.g., voice over IP (VoIP)). The communications server 44 manages IP communications functions for at least one IP endpoint 54 via the converged IP network 52. The IP endpoint 54, for example, may comprise an IP telephone or the like. The communications server 44, for example, controls the connection of an IP telecommunication event (e.g., a VoIP call) between an IP endpoint 54 and another communications endpoint 28 (e.g., a telephone) via the signal channel media processor 48 and further controls voice traffic for the connection via the bearer channel media processor 50.

In the embodiment shown in FIG. 1, for example, the signal channel media processor 48 comprises four ports: a first control port CP1, a second control port CP2, a first tunnel port TP1 and a second tunnel port TP2. The control and tunnel ports may be statically or dynamically established for the signal channel media processor 48. Tunneling comprises temporarily changing the destination of a packet in order to traverse one or more routers that are incapable of routing to the real destination. Although the present embodiment describes the tunneling functionality of the present invention with respect to the signal channel media processor 48, it may also be implemented with respect to the bearer channel media processor 50 (i.e., the bearer channel media processor 50 may comprise the first and second tunnel ports TP1 and TP2).

The first control port CP1 is connected to the communications server 44 for communicating with the communications server 44 with respect to controlling IP communications between an IP endpoint 54 and another communications device. The second control port CP2 is connected to the IP network for controlling the IP communications between the IP endpoint 54 and the other communications device. For example, where the IP endpoint 54 comprises an IP telephone participating in a telephone call, the communications server 44 may determine that the telephone call has gone "on-hook" (i.e., the telephone has been hung up). In this example, the communications server 44 sends a control message to the signal channel media processor 48 via the first control port CP1, as known in the art, instructing the signal channel media processor 48 to close a socket being used by the IP telephone for the call. The signal channel media processor 48 then communicates with the converged IP network 52 via the second control port CP2 to close the socket associated with the call.

The first and second tunnel ports TP1 and TP2 of the signal channel media processor 48, however, are used to "tunnel" information between the communications server 44 and an IP endpoint 54 via the converged IP network 52. Where the communications server 44 or an IP endpoint 54 send information to one of the tunnel ports TP1 or TP2, the signal channel media processor 48 forwards the information to the IP endpoint 54 or the communications server 44, respectively. Thus, if the signal channel media processor 48 receives information via a control port CP1 or CP2, the signal channel media processor 48 performs as a traditional signal channel media processor, while if the signal channel media processor 48 receives information via a tunnel port TP1 or TP2, the signal channel media processor 48 performs a tunneling function to transmit information between the communications server 44 and an IP endpoint 54. In this manner, the functionality of the signal channel media processor 48 is determined by the port that an instruction is received at the signal channel media processor 48.

As discussed above, the communications server 44 typically comprises a sensitive component of the customer network 42 (e.g., handles 911 emergency calls) and is isolated from the converged IP network 52 to prevent unauthorized access to the communications server 44. Thus, for security reasons, the communications server 44 is typically prevented from directly addressing IP endpoints 54 via the converged IP network 52, and the IP endpoints 54 are also prevented from directly addressing the communications server 44. The signal channel media processor 48 and the bearer channel media processor 50 serve to isolate the communications server 44 from the converged IP network 52.

The destination of traffic flowing from the communications server 44 to the converged IP network 52 can be controlled to provide security constraints by limiting the devices the communications server 44 (and thus a remote user) can communicate with to specific devices connected to the converged IP network 52. For example, the signal channel media processor 48 may operate as a "dumb" router that will forward information from the communications server 44 only to an IP address on the converged IP network 52 identified in the tunnel command issued to the signal channel media processor 48 via the first tunnel port TP1. Thus, the signal channel media processor 48 will not forward information to a device connected to the converged IP network 52 unless it is associated with a valid IP address for the converged IP network 52. In one embodiment, a device table 76 (shown in FIG. 2) is maintained on a data storage device 62 of the communications server 44. The device table, for example, may comprise an IP endpoint identifier (e.g., a telephone number or the like) and a valid IP address for a predetermined number of IP endpoints 54 located on the converged IP network 52. The device table 76 is maintained on the communications server 44 located on the customer network 42, which is under control of the customer, and provides a secure list of IP endpoints 54 that may be accessed remotely. As described below, when the appliance manager application 46 receives a request for access to an IP endpoint 54 (e.g., via an IP endpoint identifier), the appliance manager application 46 may determine whether the requested IP endpoint 54 is allowed to be accessed. If the identifier is not listed in the device table 76, the appliance manager application 46 prevents remote access to the requested device. If the identifier for an IP endpoint 54 is listed in the device table 76, however, the appliance manager application forwards the request to the IP endpoint 54 via the signal channel media processor 48 and the converged IP network 52.

In another embodiment, the device table 76 may reside in the signal channel media processor 48, and the signal channel media processor 48 may restrict access in two directions between the communications server 44 and particular IP endpoints 54 on the converged IP network 52 listed in the device table 76. In the first direction, the signal channel media processor 48 limits communications from the communications server 44 to the IP endpoints 54 listed in the device table 76 by refusing to forward commands received at the first tunnel port TP1 to the converged IP network 52 unless the destination IP endpoint is listed in the device table 76. In the second direction the signal channel media processor 48 also limits communications received from the converged IP network 52 to the communications server 44 via the second tunnel port TP2 to specific devices identified in the device table 76. In particular, if a message arrives at the second tunnel port TP2 from the converged IP network 52 and did not originate from an allowable IP endpoint 54, the signal channel media processor may refuse to forward the message to the communications server 44.

Figure 3:
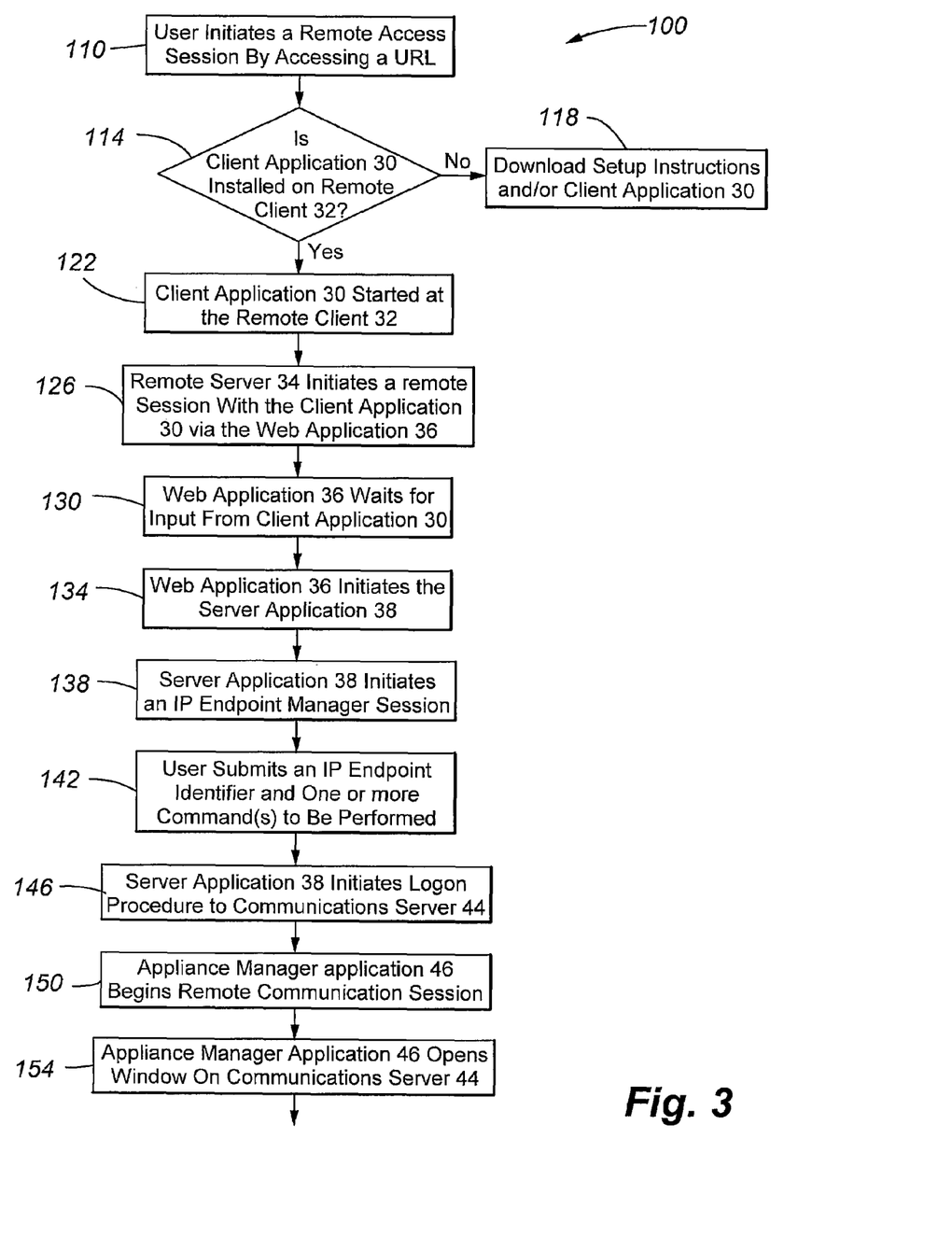
FIG. 3 shows a flow diagram of an embodiment of a method for remotely accessing an IP appliance connected to an IP communications network.

FIG. 3 shows a flow diagram of an embodiment of a method 100 for establishing a remote communication session on a communications server 44 located on a private customer network 42. In this embodiment, the user initiates a remote access session by accessing a uniform resource locator (URL) (e.g., http://avaya.com/remoteaccess/ipendpoint) via the client application 30 at the remote client 32 in operation 110. In operation 114, the method 100 determines whether the client application 30 is installed on the remote client 32. If the application 30 is not installed on the remote client 32, the setup instructions and/or the client application 30 are downloaded onto the remote client 32 in operation 118. If the client application 30 is already installed on the remote client 32 (or after it has been installed on the remote client 32), the method proceeds to operation 122.

In operation 122, the user starts the client application 30 at the remote client 32. The remote server 34 initiates a remote session (e.g., a web session) with the client application 30 at the remote client 32 via the web application 36 in operation 126. After the remote session has been started in operation 126, the web application 36 waits for an input from the client application 30 in operation 130. Once an input is received from the client application 30, the web application 36 initiates the server application 38 in operation 134. The server application 38, in turn, initiates an IP endpoint manager session on the remote server 34 in operation 138.

In one embodiment of the present invention, a virtual persistent connection is established between the remote client 32 and the remote server 34. A virtual persistent connection provides a connection that appears to a user that the connection remains connected to an application even though the connection is actually disconnected each time a transaction (e.g., at a web page) is completed. Where the remote client 32 and the remote server 34 are connected over the Internet, for example, the connection 33 between the remote client 32 and the remote server 24 is typically not a persistent connection (i.e., the connection is disconnected each time there is a transaction at a web page). In such a situation, a virtual persistent connection may be established to provide the appearance of a persistent connection between the remote client 32 and the remote server 34. The web application 36 and/or the server application 38, for example, may use a common gateway interface (CGI) to maintain a table in which one or more existing virtual persistent connection(s) are stored (e.g., between the remote server and one or more remote client(s)). When the server application 38 is about to transmit information to the client application 30, the server application 38 consults the table to see if a virtual persistent connection currently exists. If so, the server application 38 establishes a connection transparent to a user at the remote client 32 and transmits the information as if a persistent connection were in place. Then, the managing application closes the connection and waits for the next transmission.

In connection with service operations involving an IP endpoint 54, the user submits an IP endpoint identifier for the IP endpoint 54 and, optionally, one or more command(s) to be performed with respect to the identified IP endpoint 54 in operation 142. An IP endpoint identifier, for example, may comprise a telephone number assigned to a particular IP endpoint or any other identifier for one or more IP endpoint(s). The optional command, for example, may comprise a command to read information from an IP endpoint, write information to the IP endpoint, reset information on an IP endpoint, ping an IP endpoint or the like. Where a system is limited to a particular command (e.g., read MIB information from an IP endpoint) or group of commands (e.g., read MIB information from an IP endpoint and ping the IP endpoint) and does not enable other commands to be performed, the command field does not have to be included since the same command (or group of commands) will be performed on the IP endpoint for each request.

The server application 38 then establishes a connection with the communications server 44 and initiates a logon procedure to the communications server 44 via the remote communications application 45 and the communications network 40 in operation 146. In an embodiment where the communications network 40 comprises a PSTN, for example, the server application 38 and the remote communications application 45 communicate via a computer telephone integration (CTI) protocol. After the server application 38 has logged on to the communications server 44, the appliance manager application 46 begins a remote communication session with the client application 30 via the server application 38 in operation 150. In one embodiment, for example, the appliance manager application 46 initiates the remote session with the client application 30 by opening a window (e.g., a SAT window) on the communications server 44 in operation 154.

Once the remote communication session is opened between the remote client 32 and the communications server 44, a user at the remote client 32 may access one or more tools for communicating with the customer network 42. In the embodiment shown in FIG. 4, for example, the user may access an IP endpoint 54 located on a converged IP network 52 of the private customer network 42. In this embodiment, a method 200 is shown for accessing the IP endpoint 54.

Figure 4:
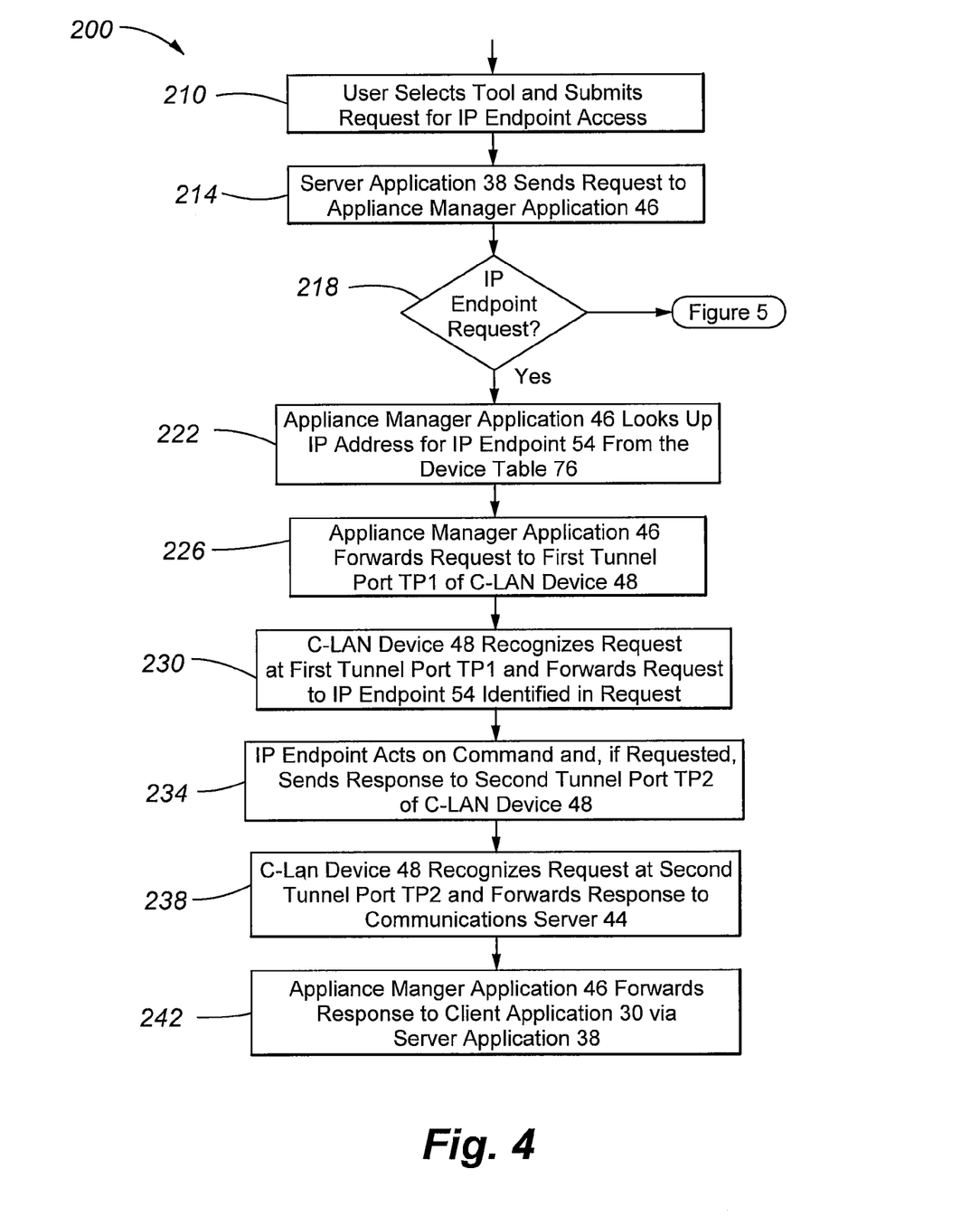
FIG. 4 shows a flow diagram of an embodiment of a method for remotely accessing an IP endpoint of an IP communications network.

In operation 210, for example, the user selects a tool for accessing an IP endpoint 54 and submits a request for access to an IP endpoint 54 (e.g., read data, write data, reset data, ping an endpoint and the like). This request is forwarded to the server application 38 residing on the remote server 38 and is forwarded by the server application 38 to the appliance manager application 46 in operation 214. As described above, the request includes an IP endpoint identifier (e.g., a telephone number corresponding to the IP endpoint 54). The appliance manager application 46 determines that the request is to access an IP endpoint 54 in operation 218 and proceeds to operation 222.

In operation 222, the appliance manager application 46 looks up the IP endpoint identifier in a device table 76 (see FIG. 2) to determine the IP address for the IP endpoint 54 on the converged IP network 52. As described above with reference to FIG. 1, if the requested IP endpoint 54 is not listed in the device table 76, the appliance manager application 46 may determine that the IP endpoint 54 identified in the request is not a valid IP endpoint on the converged IP network 52 or may determine that the IP endpoint is not on a list of remotely accessible IP endpoints and refuse to access the requested IP endpoint. Accordingly, embodiments of the present invention prevent a remote user from accessing any general purpose computing device 26 or other device on the converged IP network 52 that is not an IP endpoint.

If the IP endpoint 54 requested to be accessed is listed in the device table 76, however, the appliance manager application 46 forwards a request to the first tunnel port TP1 (see FIG. 1) of the signal channel media processor 48 in operation 226. In one embodiment, for example, the appliance manager application 48 comprises a MIB browser for communicating with an IP endpoint 54 and reading, writing and resetting MIB information located on the IP endpoint 54. The appliance manager application 48, for example, may issue a request comprising a simple network management protocol (SNMP) request for querying MIB information in the IP endpoint 54. The use of SNMP and ICMP protocols between the communications server 44 and the IP endpoint 54 allows for the system 20 to query an IP endpoint at a network management software level, yet does not compromise security on the private customer network 42, nor does it allow access to network routers, switches and the like. In effect, the system 20 allows commands originating from the remote diagnostic system 24 to be securely "tunneled" through the signal channel media processor 48 (or the bearer channel media processor 50) to an IP endpoint 54. Furthermore, this remote diagnostic capability is provided without compromising the separation between the communications server 44 and the converged IP network 52 that is maintained to prevent tampering with the customer network 42 components or settings.

The signal channel media processor 48 receives the request at the first tunnel port TP1 and recognizes (by the port accessed) that the request is to be tunneled to an IP endpoint 54 located on the converged IP network 52. The signal channel media processor 48 forwards the request to the IP endpoint 54 at the IP address identified in the request in operation 230. The IP endpoint receives the request, performs any requested action (e.g., reset MIB information) and, if requested (e.g., read MIB information), forwards a response to the second tunnel port TP2 of the signal channel media processor 48 in operation 234. Again, when the response is received at the second tunnel port TP2, the signal channel media processor 48 recognizes the request as a response to be forwarded to the communications server 44. The signal channel media processor 48 then forwards the response to the communications server 44 in operation 238. When the appliance manager application 46 residing on the communications server 44 receives the response, the appliance manager application 46 forwards the response to the client application 30 via the server application 38 in operation 242.

The method shown in FIG. 4 provides a user located at the remote client 32 to remotely access an IP endpoint 54 and retrieve information such as MIB information from the IP endpoint 54 attached to a remote private customer network 42. In this embodiment, the user may retrieve MIB information such as circuit status, endpoint information, forward error correction (FEC) status, error counts, direct memory access (DMA) buffer, DMA error counts, voice/data statistics, active endpoint information, ping, active background ping IP adders, queue read information, current route table, resource reservation protocol (RSVP) statistics, real time conferencing protocol (RTCP) status, hardware components, trace route (IP address), current vintage information and the like. In addition, where the security of the information on the IP endpoints 54 themselves is not an overriding concern, the MIB information may also be set (or reset) in the IP endpoints 54. In another embodiment, however, the user may be prevented from setting or resetting any MIB information in the IP endpoints 54. Alternatively, a higher security level or protection may limit the ability to set (or reset) information in the IP endpoints 54 to a select group of users.

Figure 5:
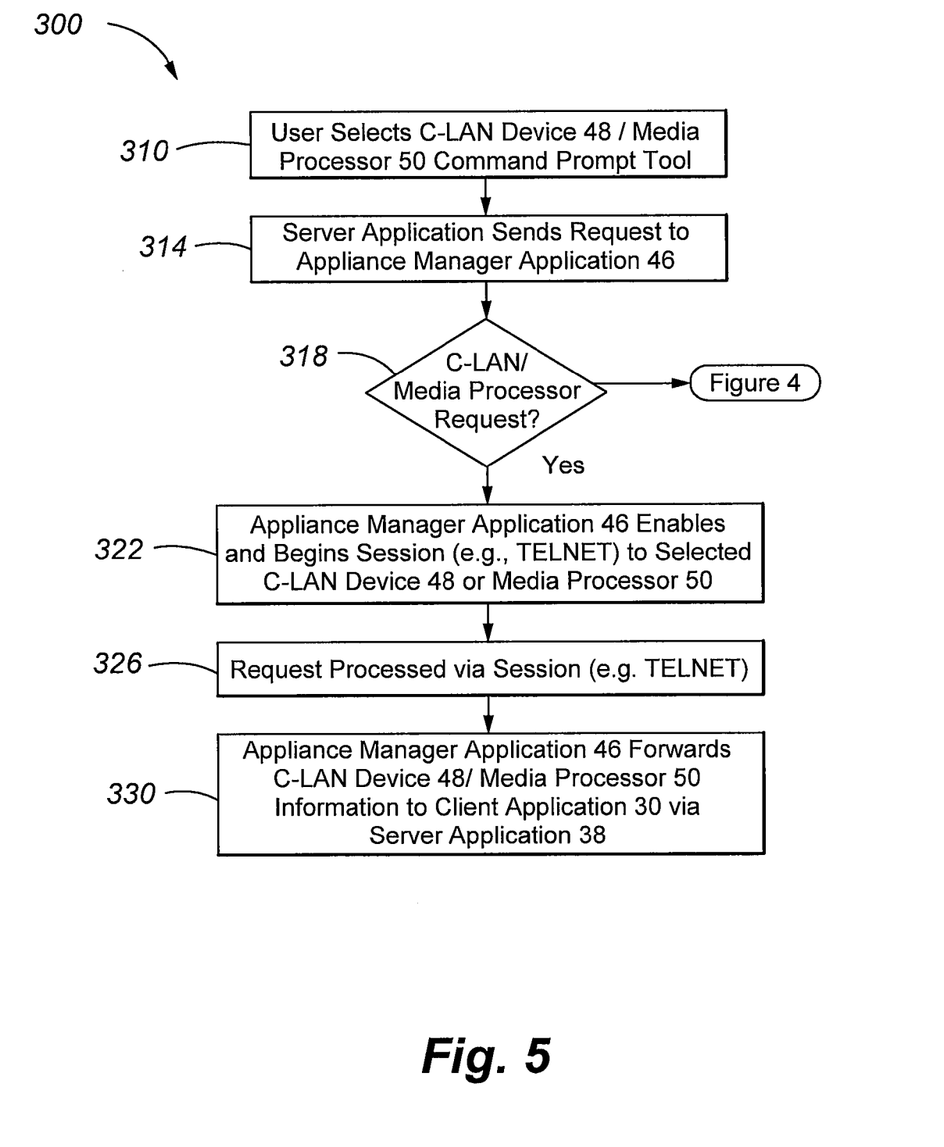
FIG. 5 shows an embodiment of a method for remotely accessing an IP communications device on an IP communications network.

FIG. 5 shows an embodiment of a method 300 for remotely accessing the signal channel media processor 48 and/or the bearer channel media processor 50 of the private customer network 42. In this embodiment, for example, the method shows a user accessing a command prompt of the signal channel media processor 48 and/or the bearer channel media processor 50 shown in FIG. 1.

In operation 310, a user selects the signal channel media processor 48 and bearer channel media processor 50 command prompt tool from a window on the communications server 44 (see FIG. 3). The server application 38 forwards the request to the appliance manager application 46 in operation 314. The appliance manager application 46 then determines that the request is to access a command prompt of the signal channel media processor 48 or the bearer channel media processor 50. In operation 322, the appliance manager application 46 enables and begins a session (e.g., a Telnet session) to a selected signal channel media processor 48 or bearer channel media processor 50. After the session (e.g., the Telnet session) is successfully begun, the request from the remote client 32 is then processed by the session initiated in operation 322 in operation 326. After the request has been processed, the appliance manager application 46 forwards result of the request executed on the signal channel media processor 48 or the bearer channel media processor 50 to the client application 30 via the server application 38.

The method shown in FIG. 5 provides a user located at the remote client 32 to remotely access a device on a remote private customer network 42. In one embodiment, for example, a user may remotely access the signal channel media processor 48 and/or the bearer channel media processor 50 command prompt and perform diagnostic functions on the signal channel media processor 48 of a remote private customer network 42. In this embodiment, for example, the user may initiate signal channel media processor diagnostic commands on the signal channel media processor 48 from the remote client 32. The user may initiate diagnostic commands, such as show system buffers, display address resolution protocol (ARP) table, flush ARP table, display socket table information, show host table, check stack, get system buffer usage, display network interfaced, main Ethernet interface statistics, display active IP sockets, display IP statistics, point-to-point protocol (PPP) information, PPP statistics, show Internet control message protocol (ICMP) statistics, route show, route statistics, show task regs, task show, transmission control protocol (TCP) statistics, user datagram protocol (UDP) statistics and the like.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for allowing remote access to a private IP communications network from a public network, the method comprising:
    a communications server sending a first message addressed to a control port of an IP communications network component, the first message comprising a command requesting the performance of a selected telecommunications function by a selected IP endpoint;
    in response to the first message, the selected IP endpoint performing the requested telecommunications function;
    the communications server sending a second message addressed to a tunneling port of the IP communications network component, the second message comprising a request for information associated with the IP endpoint; and
    in response to receiving the second message at the tunneling port, the IP communications network component tunneling the second message to the IP endpoint.

2. The method of claim 1, wherein the IP communications network component comprises a signal channel media processor.

3. The method of claim 2, wherein the first message comprises a message for controlling a connection of an IP telephony communication.

4. The method of claim 1, wherein the IP communications network component comprises a bearer channel media processor.

5. The method of claim 4, wherein the second message comprises a message for controlling an IP voice data.

6. The method of claim 1, wherein the IP communications network component isolates the communications server from a converged IP network that communicates with the IP endpoint.

7. The method of claim 1, further comprising:
    the IP communications network component receiving a response from the IP endpoint at a third port; and
    the IP communications network component tunneling the response to the communications server.

8. The method of claim 1, further comprising:
    the communications server receiving, from a remote diagnostic system, a diagnostic request to send the second message; and
    in response to the request, the communications server generates the second message.

9. The method of claim 8, wherein the diagnostic request comprises an IP endpoint identifier associated with the IP endpoint.

10. The method of claim 9, wherein the communications server compares the IP endpoint identifier to a table to determine an IP address for the IP endpoint.

11. The method of claim 9, wherein the communications server determines whether to allow access to the IP endpoint with the IP endpoint identifier.

12. The method of claim 10, wherein the IP endpoint identifier is compared to a table to determine whether to allow access to the IP endpoint.

13. The method of claim 9, wherein the IP endpoint identifier comprises a telephone number.

14. The method of claim 8, wherein the remote diagnostic system comprises a remote client and a remote server.

15. The method of claim 14, wherein the remote client and remote server are connected via a virtual persistent connection.

16. The method of claim 1, wherein the communications server queries IP endpoints in an IP telephony communications network.

17. The method of claim 1, further comprising:
    receiving a command from a remote diagnostic system;
    sending a third message addressed to a second port of the IP communications, the second message comprising the command; and
    executing, in response to receiving the second message at the second port, the command at the IP communications network component.

18. The method of claim 1, further comprising receiving a response to the second message from the IP endpoint.

19. The method of claim 18, wherein the operation of sending the second message is performed in response to a request from a remote diagnostic system, and the response to the second message is forwarded to the remote diagnostic system.

20. A system for allowing remote access to an IP endpoint device on a communications network, the system comprising:
    a communications server adapted to manage communications functions of a selected IP endpoint via a signal channel media processor and a private network, the communications server comprising:
        a remote communications application residing on the communications server adapted to communicate with a remote diagnostic system via a public network, the remote communications application adapted to receive a query for the IP endpoint from the remote diagnostic system and to provide a response to the query received from the IP endpoint to the remote diagnostic system; and
        an appliance manager application residing on the communications server adapted to:
            send a first message addressed to a control port of the signal channel media processor, the first message comprising a command requesting the performance of a selected telecommunications function at the IP endpoint;
            tunnel the command to the IP endpoint via a tunneling port of the signal channel media processor; and
            receive a response from the IP endpoint via the signal channel media processor,
            wherein the communications server is adapted to be isolated from the private network via the signal channel media processor, and the application manager application is adapted to allow limited communication between the communications server and the IP endpoint via the signal channel media processor.

21. The system of claim 20, wherein the signal channel media processor receives the response at a third port and sends the response by a fourth port to the IP endpoint.

22. The system of claim 20, wherein the communications server further comprises a bearer channel media processor for controlling IP voice data for the IP endpoint.

23. The system of claim 20, wherein the second port is dynamically assigned.

24. The system of claim 20, wherein the second port is statically assigned.

25. The system of claim 20, wherein the IP endpoint comprises a telephony IP endpoint.

26. The system of claim 20, wherein the appliance manager application comprises a device table including the IP endpoint on the private network.

27. The system of claim 20, wherein the signal channel media processor is configured as a dedicated network interface card for the communications server.

28. The system of claim 20, wherein the signal channel media processor is configured as a temporary network interface card for the communications server.

29. The system of claim 20, wherein the appliance manager application is adapted to tunnel the query in an SNMP protocol.

30. The system of claim 20, wherein the appliance manager application comprises a MIB browser for accessing information on an IP endpoint.

31. The system of claim 20, wherein the remote communications application is adapted to communicate with a remote user via a virtual persistent connection.

32. A system for allowing remote access to an IP endpoint device on a communications network, the system comprising:

a communications server for managing telecommunications functions of a selected IP endpoint via a bearer channel media processor and a private network, the communications server means comprising:

a remote communications application for communicating with a remote diagnostic system via a public network by receiving a query for the IP endpoint from the remote communications system and providing a response to the query received from the IP endpoint; and an appliance manager for:

reading a IP endpoint identifier from the query received by the remote communications;

comparing the IP endpoint identifier to a table of endpoint identifiers in accessible via the private network;

if the IP endpoint identifier is in the table, tunneling the query to the IP endpoint via a tunnel port of the bearer channel media processor;

receiving a response from the IP endpoint via a second port of the bearer channel media processor, wherein the communications server is adapted to be isolated from the private network via the bearer channel media processor, and the appliance manager allows limited communication between the communications server and the IP endpoint; and if the IP endpoint identifier is not in the table, blocking the query from being sent to any IP endpoint.

* * * * *